United States Patent
Yue et al.

(10) Patent No.: US 10,149,158 B2
(45) Date of Patent: Dec. 4, 2018

(54) ACCESS METHOD, SYSTEM, AND DEVICE OF TERMINAL, AND COMPUTER STORAGE MEDIUM

(71) Applicant: ZTE CORPORATION, Guangdong (CN)

(72) Inventors: Zonghe Yue, Guangdong (CN); Jing Xu, Guangdong (CN)

(73) Assignee: ZTE CORPORATION, Guangdong (CN)

(*) Notice: Subject to any disclaimer, the term of this patent is extended or adjusted under 35 U.S.C. 154(b) by 185 days.

(21) Appl. No.: 15/028,180

(22) PCT Filed: Mar. 31, 2014

(86) PCT No.: PCT/CN2014/074485
§ 371 (c)(1),
(2) Date: May 19, 2016

(87) PCT Pub. No.: WO2014/180198
PCT Pub. Date: Nov. 13, 2014

(65) Prior Publication Data
US 2016/0277928 A1 Sep. 22, 2016

(30) Foreign Application Priority Data
Oct. 9, 2013 (CN) .......................... 2013 1 0468428

(51) Int. Cl.
*H04W 12/06* (2009.01)
*H04L 29/06* (2006.01)
(Continued)

(52) U.S. Cl.
CPC ......... *H04W 12/06* (2013.01); *H04L 63/0428* (2013.01); *H04L 63/0869* (2013.01); *H04L 63/0876* (2013.01); *H04L 63/10* (2013.01); *H04W 12/08* (2013.01); *H04W 48/16* (2013.01); *H04W 76/10* (2018.02); *H04W 88/16* (2013.01)

(58) Field of Classification Search
CPC ..... H04W 12/06; H04L 63/0876; G06F 21/44
See application file for complete search history.

(56) References Cited

U.S. PATENT DOCUMENTS

| | | | | |
|---|---|---|---|---|
| 2011/0004760 A1* | 1/2011 | Sharaga | ............... | H04L 9/0844 713/171 |
| 2013/0095789 A1* | 4/2013 | Keevill | ................ | H04W 12/06 455/411 |

FOREIGN PATENT DOCUMENTS

| | | |
|---|---|---|
| CN | 101114901 | 1/2008 |
| CN | 101765057 | 6/2010 |
| CN | 103024742 | 4/2013 |

OTHER PUBLICATIONS

International Search Report for PCT/CN2014/074485, dated Jul. 14, 2014, 4 pages.

* cited by examiner

*Primary Examiner* — David J Pearson
(74) *Attorney, Agent, or Firm* — Nixon & Vanderhye P.C.

(57) ABSTRACT

The present disclosure discloses a terminal access method, system and device, and a computer storage medium. The method comprises: after establishing an WiFi connection with a wireless gateway, a terminal sends a terminal identity verification request and a gateway identity verification request to the wireless gateway; and after confirming that the terminal identity verification and gateway identity verification succeed, accesses to a wireless broadband network through the WiFi connection.

11 Claims, 6 Drawing Sheets

(51) Int. Cl.
*H04W 48/16* (2009.01)
*H04W 12/08* (2009.01)
*H04W 76/10* (2018.01)
*H04W 88/16* (2009.01)

ACCESS METHOD, SYSTEM, AND DEVICE OF TERMINAL, AND COMPUTER STORAGE MEDIUM

This application is the U.S. national phase of International Application No. PCT/CN2014/074485 filed 31 Mar. 2014, which designated the U.S. and claims priority to CN Patent Application No. 201310468428.4 filed 9 Oct. 2013, the entire contents of each of which are hereby incorporated by reference.

TECHNICAL FIELD

The present disclosure relates to security access technologies of mobile communications, and particularly to a terminal access method, system and device, and a computer storage medium.

BACKGROUND ART

A traditional wireless gateway is a device converting wired broadband signals into wireless fidelity (WiFi) signals, and mobile terminals such as tablet computer, smart cellphone, laptop and the like can access to wired broadband to access Internet after establishing a connection with a wireless gateway through WiFi.

In the related art, a new customer premise equipment (CPE) is a wireless gateway converting high-speed 3G/4G signals into WiFi signals, and is capable of supporting a plurality of terminals to access to Internet simultaneously, and has a size equivalent to a book, and can be used in places covered by 3G/4G signals when being plugged in without arranging a network cable, so that it is convenient to use and carry. In countries such as the United States, Japan and the like where long term evolution (LTE) networks are fulfilled for commercial use, operators also use CPEs as main equipments for 4G commercial use.

However, because of limitation of security of WiFi, more and more conditions of loitering network through WiFi occur. Here, the loitering network refers to accessing to an WiFi network of others by means of approaches such as password cracking and the like so as to achieve a purpose of using a wired broadband network for free. Back ends of most traditional WiFi gateways access to a wired broadband network, and such wired broadband network is charged in monthly payment in general without traffic limit. Therefore, damage of loitering network is not very serious. However, for an CPE using a 3G/4G wireless broadband, loitering network means stealing traffic by invalid users since such a wireless broadband is charged according to traffic in general, so that valid users of an CPE will suffer certain economic losses.

SUMMARY

Embodiments of the present disclosure provide a terminal access method, system and device, and a computer storage medium, which can effectively prevent invalid terminals from using a wireless broadband access network.

The technical solution in embodiments of the present disclosure is realized by that:

Embodiments of the present disclosure provide a terminal access method, the method including:

after establishing an WiFi connection with a wireless gateway, a terminal initiating terminal identity verification and gateway identity verification to the wireless gateway; and after the initiated terminal identity verification and gateway identity verification succeed, accessing to a wireless broadband network through the WiFi connection, where initiating terminal identity verification and gateway identity verification to the wireless gateway includes:

the terminal sending a terminal identity verification request to the wireless gateway, the terminal identity verification request carrying terminal identity information; and when the terminal identity information is successfully verified, the terminal sending a gateway identity verification request to the wireless gateway, the gateway identity verification request carrying gateway identity information, where initiating terminal identity verification to the wireless gateway includes:

the terminal extracting a terminal ID of the terminal as a plaintext, and calculating the terminal ID using an Internet protocol (IP) address and/or a medium access control (MAC) address to obtain a first encryption key;

encrypting the terminal ID using the first encryption key and a first encryption algorithm; and carrying the ciphertext obtained by encryption in the terminal identity verification request and then sending same to the wireless gateway, where the terminal initiating the gateway identity verification request to the wireless gateway includes:

the terminal extracting a gateway ID as a plaintext, and encrypting the gateway ID using a second encryption key and a second encryption algorithm; and carrying the ciphertext obtained by encryption in the gateway identity verification request and then sending same to the wireless gateway, where the second encryption key is obtained by calculation by the wireless gateway according to random numbers; and the second encryption algorithm is an irreversible encryption algorithm.

Embodiments of the present disclosure further provide a wireless access method, the method including:

after successfully verifying information carried in an WiFi connection request of a terminal, a wireless gateway establishing an WiFi connection with the terminal;

correspondingly conducting terminal identity verification and gateway identity verification according to a terminal identity verification request and a gateway identity verification request initiated by the terminal; and when both terminal identity verification and gateway identity verification succeed, accessing the terminal to a wireless broadband network through the WiFi connection, where conducting terminal identity verification includes:

the wireless gateway deciphering the terminal identity verification request to obtain a terminal ID;

querying the terminal ID in a terminal identity validity list; and when the terminal ID is found out, judging that terminal identity verification succeeds, and when the terminal ID is not found out, judging that terminal identity verification fails, where conducting gateway identity verification includes:

the wireless gateway deciphering the gateway identity verification request to obtain a gateway ID; and comparing the gateway ID obtained by decryption with a gateway ID of the wireless gateway, if they are the same, judging that gateway identity verification succeeds; otherwise, judging that gateway identity verification fails, where the method further includes:

calculating according to random numbers to obtain a second encryption key, and sending the second encryption key to the terminal;

accordingly, conducting gateway identity verification includes:

the wireless gateway extracting the gateway ID of the wireless gateway as a plaintext, and encrypting the extracted gateway ID using the second encryption key and the second encryption algorithm, the second encryption algorithm being an irreversible encryption algorithm; and comparing the ciphertext obtained by decryption with the ciphertext carried in the gateway identity verification request, if the ciphertext are the different, judging that gateway identity verification fails; and if the ciphertext are the same, judging that gateway identity verification succeeds.

Embodiments of the present disclosure further provide a terminal, the terminal including: a first WiFi module, an identity verification request module and a first wireless broadband module, where the first WiFi module is configured to establish an WiFi connection with a wireless gateway;

the identity verification request module is configured to initiate terminal identity verification and gateway identity verification to the wireless gateway; and the first wireless broadband module is configured to access to the wireless broadband network through the WiFi connection after both terminal identity verification and gateway identity verification initiated by the identity verification request module succeed, where the identity verification request module is further configured to send a terminal identity verification request to the wireless gateway, the terminal identity verification request carrying terminal identity information; and when the terminal identity information is successfully verified, send a gateway identity verification request to the wireless gateway, the gateway identity verification request carrying gateway identity information, where the identity verification request module is further configured to extract a terminal ID of the terminal as a plaintext, and calculate the terminal ID using an Internet protocol (IP) address and a medium access control (MAC) address to obtain a first encryption key;

encrypt the terminal ID using the first encryption key and the first encryption algorithm; and carry the ciphertext obtained by encryption in the terminal identity verification request and then send same to the wireless gateway, where the identity verification request module is further configured to extract a gateway ID as a plaintext, and encrypt the gateway ID using a second encryption key and a second encryption algorithm; and carry the ciphertext obtained by encryption in the gateway identity verification request and then send same to the wireless gateway.

Embodiments of the present disclosure further provide a wireless gateway, the wireless gateway including: a second WiFi module, an identity verification request module, a route control module and a second wireless broadband module, where the second WiFi module is configured to establish an WiFi connection with a terminal after successfully verifying information carried in an WiFi connection request of the terminal;

the identity verification module is configured to correspondingly conduct terminal identity verification and gateway identity verification according to a terminal identity verification request and a gateway identity verification request initiated by the terminal;

the route control module is configured to establish a connection for the terminal, of which both terminal identity verification and gateway identity verification succeed with the wireless broadband network via the second wireless broadband module through the WiFi connection; and the second wireless broadband module is configured to establish a connection with the wireless broadband network, where the wireless gateway further includes an identity management module which is configured to store a terminal identity validity list and a gateway ID of the wireless gateway; and the identity verification module is further configured to decipher the terminal identity verification request to obtain a terminal ID, query the terminal ID in the terminal identity validity list stored in the identity management module, and judge that terminal identity verification succeeds when the terminal ID is found out; and judge that terminal identity verification fails when the terminal ID is not found out, where the identity verification module is further configured to decipher the gateway identity verification request to obtain a gateway ID, compare the gateway ID obtained by decryption with the gateway ID stored in the identity management module, and if they are the same, judge that gateway identity verification succeeds; otherwise, judge that gateway identity verification fails, where the identity verification module is further configured to calculate according to random numbers to obtain a second encryption key, and send the second encryption key to the terminal;

the identity verification module is further configured to use the gateway ID stored in the identity management module as a plaintext when the terminal initiates a gateway identity verification request, and encrypt the gateway ID using the second encryption key and a second encryption algorithm, the second encryption algorithm being an irreversible encryption algorithm; and compare the ciphertext obtained by decryption with the ciphertext carried in the gateway identity verification request, and if the ciphertext are the different, judge that gateway identity verification fails; and if the ciphertext are the same, judge that gateway identity verification succeeds.

Embodiments of the present disclosure further provide a terminal access system, the system including the above-mentioned terminal and the above-mentioned wireless gateway.

Embodiments of the present disclosure further provide a computer storage medium, where computer executable instructions are stored in the computer storage medium, the computer executable instructions being used for executing the above-mentioned terminal access method.

In the technical solution provided in embodiments of the present disclosure, after the WiFi connection initiated by the terminal to the wireless gateway succeeds, the terminal initiates two verification, i.e. terminal identity verification and gateway identity verification to the wireless gateway, and the terminal establishes a connection with the wireless broadband network through WiFi only after both terminal identity verification and gateway identity verification succeed; compared with the technical solution in the related art that the terminal accesses to the wireless broadband network by only conducting one verification, the success rate of cracking passwords by invalid terminals is greatly reduced, so that the invalid terminals can be effectively prevented from using access networks, thereby preventing valid terminal users from suffering economic loss.

DETAILED DESCRIPTION

In embodiments of the present disclosure, after an WiFi connection initiated by a terminal to a wireless gateway succeeds, the terminal initiates two times of verification including terminal identity verification and gateway identity verification to the wireless gateway, and establishes a connection with a wireless broadband network through the WiFi after the terminal identity verification and gateway identity verification succeed.

When a user needs to access to a wireless broadband network, an WiFi connection request is initiated to the wireless gateway through the terminal, and the WiFi connection initiated by the terminal is confirmed successful after the wireless gateway returns that the WiFi connection is successful; the terminal sends a terminal identity verification request to the wireless gateway, the wireless gateway verifies terminal identity information in the terminal identity verification request, and returns that the terminal identity verification is successful after the verification is passed; the terminal sends a gateway identity verification request to the wireless gateway, the wireless gateway verifies gateway identity information in the gateway identity verification request, and returns that the gateway identity verification is successful after the verification is passed; and the terminal establishes a connection with the wireless broadband network via the wireless gateway and through the WiFi connection when the terminal identity verification and gateway identity verification succeed.

The present disclosure will be further explained with reference to the figures and specific embodiments.

Figure 1:
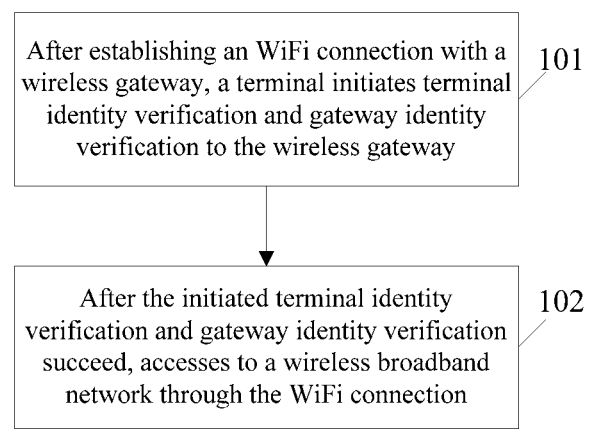
FIG. 1 is a first implementation flow diagram showing a terminal access method in embodiments of the present disclosure.

FIG. 1 is a first implementation flow diagram showing a security access method recorded in embodiments of the present disclosure; as shown in FIG. 1, a security access method recorded in embodiments of the present disclosure includes following steps:

Step 101: after establishing an WiFi connection with a wireless gateway, a terminal initiates terminal identity verification and gateway identity verification to the wireless gateway.

As an implementation mode, initiating terminal identity verification and gateway identity verification to the wireless gateway includes:

sending a terminal identity verification request to the wireless gateway by the terminal, where the terminal identity verification request carries terminal identity information; and sending a gateway identity verification request to the wireless gateway by the terminal when the terminal identity information is successfully verified, where the gateway identity verification request carries gateway identity information; alternatively, sending a gateway identity verification request to the wireless gateway by the terminal, where the gateway identity verification request carries gateway identity information; and sending a terminal identity verification request to the wireless gateway by the terminal when the gateway identity information is successfully verified, where the terminal identity verification request carries terminal identity information.

As an implementation mode, initiating terminal identity verification to the wireless gateway includes: extracting a terminal ID of the terminal as a plaintext by the terminal, and calculating the terminal ID using an Internet protocol (IP) address and/or a medium access control (MAC) address to obtain a first encryption key;

encrypting the terminal ID using the first encryption key and a first encryption algorithm; and carrying a ciphertext obtained by encryption in the terminal identity verification request and sending the ciphertext to the wireless gateway, where the first encryption algorithm is a reversible encryption algorithm, that is, the wireless gateway can decipher the ciphertext carried in the terminal identity verification request to obtain the terminal ID when receiving the terminal identity verification request.

As an implementation mode, initiating gateway identity verification to the wireless gateway by the terminal includes:

extracting a gateway ID as a plaintext by the terminal, and encrypting the gateway ID using a second encryption key and a second encryption algorithm; and carrying the ciphertext obtained by encryption in the gateway identity verification request and sending the ciphertext to the wireless gateway, where the second encryption key can be as same as or different from the first encryption key; and the second encryption algorithm can be as same as or different from the first encryption algorithm; and the second encryption algorithm is a reversible encryption algorithm, that is, the wireless gateway can decipher the ciphertext carried in the gateway identity verification request to obtain the gateway ID when receiving the gateway identity verification request.

When the terminal initiates verification requests according to a sequence of terminal identity verification and gateway identity verification, as an implementation mode, initiating terminal identity verification to the wireless gateway by the terminal includes:

extracting a terminal ID of the terminal as a plaintext by the terminal, and calculating the terminal ID using an Internet protocol (IP) address and/or a medium access control (MAC) address to obtain a first encryption key;

encrypting the terminal ID using the first encryption key and a first encryption algorithm; and carrying a ciphertext obtained by encryption in the terminal identity verification request and sending the ciphertext to the wireless gateway, where the first encryption algorithm is a reversible encryption algorithm;

accordingly, initiating gateway identity verification to the wireless gateway by the terminal includes:

extracting a gateway ID as a plaintext by the terminal, and encrypting the gateway ID using a second encryption key and a second encryption algorithm; and carrying the ciphertext obtained by encryption in the gateway identity verification request and sending the ciphertext to the wireless gateway, where the second encryption key is different from the first encryption key, the second encryption key is obtained by calculation by the wireless gateway according to random numbers; the second encryption algorithm is different from the first encryption algorithm, and the second encryption algorithm is an irreversible encryption algorithm, that is, the wireless gateway cannot decipher the ciphertext carried in the gateway identity verification request to obtain the gateway ID when receiving the gateway identity verification request; but needs to use the gateway ID of the wireless gateway as a plaintext, encrypt the gateway ID of the wireless gateway using the second encryption key obtained by calculation and a second encryption algorithm, compare the ciphertext obtained by encryption with the ciphertext carried in the gateway identity verification request, and judge whether the gateway identity request is successfully verified according to a ciphertext comparison result.

Each wireless gateway is provided with a gateway ID when being dispatched from the factory, and this ID is usually marked on a label of a back surface of a body of the wireless gateway, only valid terminal users can view the gateway ID. In the present implementation mode, since the ciphertext (corresponding to the gateway ID) carried in the gateway identity verification request cannot be deciphered, a possibility that an invalid terminal cracks a password to access to the wireless broadband network through the wireless gateway is eliminated.

Step 102: after the initiated terminal identity verification and gateway identity verification succeed, accesses to a wireless broadband network through the WiFi connection.

Figure 2:
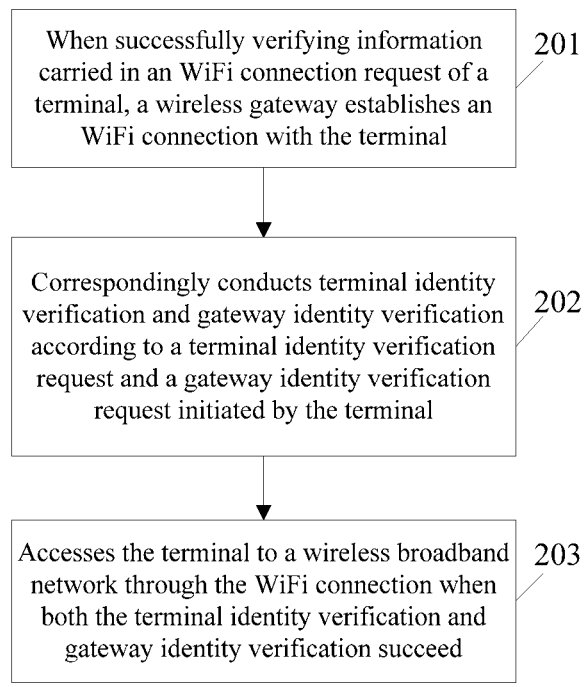
FIG. 2 is a second implementation flow diagram showing a terminal access method in embodiments of the present disclosure.

FIG. 2 is a second implementation flow diagram showing a terminal access method recorded in embodiments of the present disclosure; as shown in FIG. 2, a terminal access method recorded in embodiments of the present disclosure includes following steps:

Step 201: when successfully verifying information carried in an WiFi connection request of a terminal, a wireless gateway establishes an WiFi connection with the terminal;

Step 202: correspondingly conducts terminal identity verification and gateway identity verification according to a terminal identity verification request and a gateway identity verification request initiated by the terminal;

Step 203: accesses the terminal to a wireless broadband network through the WiFi connection when both the terminal identity verification and gateway identity verification succeed.

As an implementation mode, conducting terminal identity verification includes:

deciphering the terminal identity verification request to obtain a terminal ID by the wireless gateway;

querying the terminal ID in a terminal identity validity list; and judging that terminal identity verification succeeds when the terminal ID is found out, and judging that terminal identity verification fails when the terminal ID is not found out.

As an implementation mode, conducting gateway identity verification includes:

deciphering the gateway identity verification request to obtain a gateway ID by the wireless gateway; and comparing the gateway ID obtained by decryption with a gateway ID of the wireless gateway, and judging that gateway identity verification succeeds if the gateway ID obtained by decryption is as same as the gateway ID of the wireless gateway; otherwise, judging that gateway identity verification fails. This implementation mode is for a case that the ciphertext carried in the gateway identity verification request is encrypted using a reversible encryption algorithm.

As an implementation mode, the wireless gateway further calculates to obtain a second encryption key according to random numbers, and sends the second encryption key to the terminal;

accordingly, conducting gateway identity verification includes:

extracting the gateway ID of the wireless gateway as a plaintext by the wireless gateway, and encrypting the extracted gateway ID using the second encryption key and a second encryption algorithm, where the second encryption algorithm is an irreversible encryption algorithm; and comparing the ciphertext obtained by decryption with the ciphertext carried in the gateway identity verification request, and judging that gateway identity verification fails if the ciphertext obtained by decryption is different from the ciphertext carried in the gateway identity verification request; and judging that gateway identity verification succeeds if the ciphertext obtained by decryption is as same as the ciphertext carried in the gateway identity verification request.

Embodiments of the present disclosure further record a computer storage medium, in which computer executable instructions are stored, and the computer executable instructions is configured to execute the terminal access method shown in FIG. 1 or FIG. 2.

Figure 3:
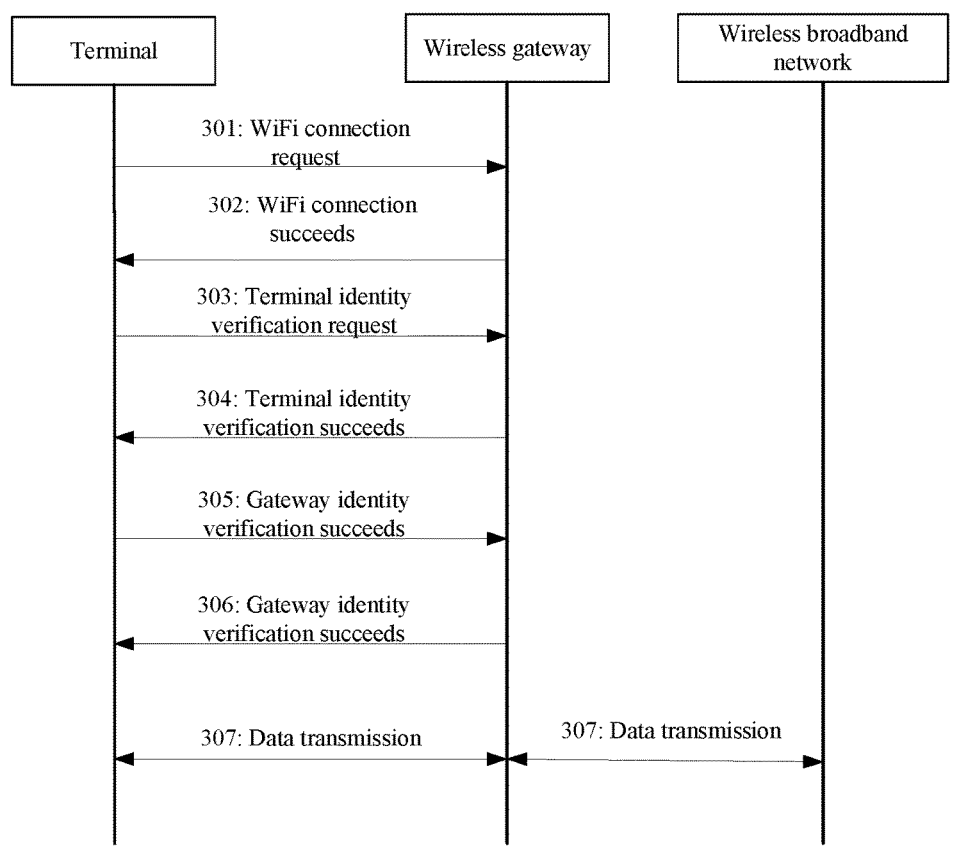
FIG. 3 is a third implementation flow diagram showing a terminal access method in embodiments of the present disclosure.

The terminal access method recorded in embodiments of the present disclosure will be further explained with reference to examples. FIG. 3 is a third implementation flow diagram showing a security access method in embodiments of the present disclosure; as shown in FIG. 3, the terminal access method recorded in embodiments of the present disclosure includes following steps:

Step 301: a terminal initiates an WiFi connection request to a wireless gateway.

The terminal sends the WiFi connection request to the wireless gateway according to a service set identifier (SSID) of a found WiFi hotspot and a preset password, where the WiFi connection request carries the preset password;

Step 302: after successfully verifying information carried in the request, the wireless gateway returns that a WiFi connection succeeds.

After receiving the WiFi connection request, the wireless gateway first conducts matching on the password carried in the WiFi connection request, to judge whether the terminal is valid, and returns that the WiFi connection fails and end current processing flow if the terminal is invalid; and returns that the WiFi connection succeeds, establishes an WiFi connection between the wireless gateway and the terminal, and executes step 303 if the terminal is valid.

Here, passwords of various valid terminals are pre-stored in the wireless gateway. By matching a password carried in the WiFi connection request with a password stored in the wireless gateway, it can be judged whether the terminal requesting to establish the WiFi connection is valid.

Step 303: the terminal sends a terminal identity verification request to the wireless gateway.

The terminal extracts the terminal ID of the terminal as a plaintext, calculates to obtain a first key K1 as a first encryption key by using an IP address and an MAC address, encrypts the terminal ID using a first encryption algorithm S1, and carries the encrypted terminal ID in the terminal identity verification request and sends the encrypted terminal ID to the wireless gateway.

Step 304: after successfully verifying terminal identity information carried in the terminal identity verification request, the wireless gateway returns to the terminal that terminal identity verification succeeds.

The wireless gateway deciphers the ciphertext carried in the terminal identity verification request to obtain a terminal ID, and queries the terminal ID obtained by decryption in a terminal identity validity list stored in the wireless gateway, and returns that terminal identity verification fails and ends current processing flow if the terminal ID is not found out; and calculates to obtain a second key K2 according to random numbers, and returns to the terminal the second key K2 as well as that terminal identity verification succeeds if the terminal ID is found out.

Step 305: the terminal sends a gateway identity verification request to the wireless gateway.

Specifically, the terminal extracts the gateway ID by a verification program of the terminal as a plaintext, adopts the second key K2 as a second encryption key, encrypts the gateway ID using the second encryption key K2 and a second encryption algorithm (irreversible encryption algorithm) S2, and carries the ciphertext obtained by encryption in the gateway identity verification request and sends the ciphertext to the wireless gateway.

Step 306: after successfully verifying gateway identity information carried in the request, the wireless gateway returns to the terminal that gateway identity verification succeeds.

The wireless gateway extracts the ciphertext after receiving the gateway identity verification request; meanwhile, extracts a pre-stored gateway ID as a plaintext, encrypts the gateway ID stored in the wireless gateway using the second encryption key K2 obtained by calculation in step 304 and the second encryption algorithm S2, compares the obtained ciphertext with the ciphertext carried in the gateway identity verification request; and returns to the terminal that gateway identity verification fails, and ends current processing flow if the obtained ciphertext is different from the ciphertext carried in the gateway identity verification request; and returns to the terminal that gateway identity verification succeeds, and accesses the terminal to the wireless broadband network if the obtained ciphertext is as same as the ciphertext carried in the gateway identity verification request.

Step 307: the terminal establishes a connection with the wireless broadband network through WiFi to conduct data transmission.

Here, the terminal, of which terminal identity verification and gateway identity verification succeed, establishes a connection with the wireless broadband network via the wireless gateway through the WiFi connection.

Figure 4:
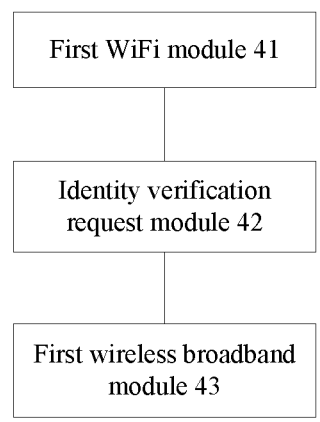
FIG. 4 is a schematic diagram showing a composition structure of a terminal in embodiments of the present disclosure.

Embodiments of the present disclosure further record a terminal. As shown in FIG. 4, the terminal includes: a first WiFi module 41, an identity verification request module 42 and a first wireless broadband module 43; where the first WiFi module 41 is configured to establish an WiFi connection with a wireless gateway;

the identity verification request module 42 is configured to initiate terminal identity verification and gateway identity verification to the wireless gateway; and the first wireless broadband module 43 is configured to access to a wireless broadband network through the WiFi connection after the terminal identity verification and gateway identity verification initiated by the identity verification request module 42 succeed.

The identity verification request module 42 is further configured to send a terminal identity verification request to the wireless gateway, where the terminal identity verification request carries terminal identity information; and send a gateway identity verification request to the wireless gateway when the terminal identity information is successfully verified, where the gateway identity verification request carries gateway identity information.

The identity verification request module 42 is further configured to extract a terminal ID of the terminal as a plaintext, and calculate the terminal ID using an Internet protocol (IP) address and/or a medium access control (MAC) address to obtain a first encryption key;

encrypt the terminal ID using the first encryption key and a first encryption algorithm; and carry a ciphertext obtained by encryption in the terminal identity verification request and send the ciphertext to the wireless gateway.

The identity verification request module 42 is further configured to extract the gateway ID as a plaintext, and encrypt the gateway ID using a second encryption key and a second encryption algorithm; and carry the ciphertext obtained by encryption in the gateway identity verification request and send the ciphertext to the wireless gateway.

In practical application, the first WiFi module 41, the identity verification request module 42 and the first wireless bandwidth module 43 may be implemented by a central processing unit (CPU), a digital signal processor (DSP) or a field-programmable gate array (FPGA) in the terminal.

Figure 5:
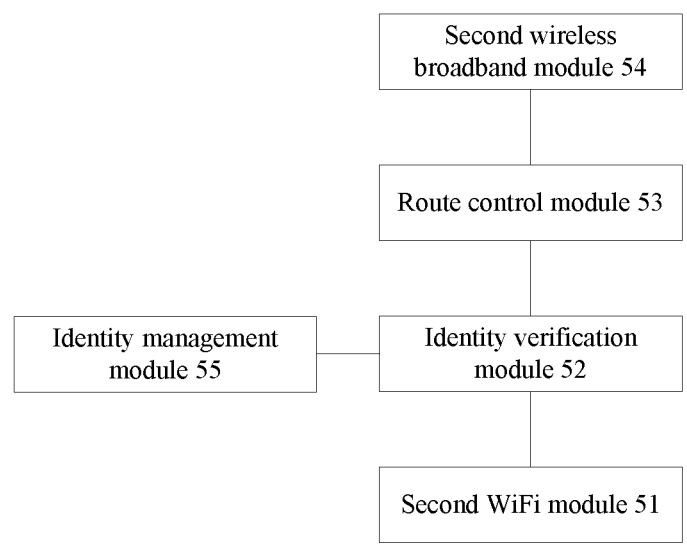
FIG. 5 is a schematic diagram showing a composition structure of a wireless gateway in embodiments of the present disclosure.

Embodiments of the present disclosure further record a wireless gateway. As shown in FIG. 5, the wireless gateway includes:

a second WiFi module 51, an identity verification module 52, a route control module 53 and a second wireless broadband module 54, where the second WiFi module 51 is configured to establish an WiFi connection with a terminal after successfully verifying information carried in an WiFi connection request of the terminal;

the identity verification module 52 is configured to correspondingly conduct terminal identity verification and gateway identity verification according to a terminal identity verification request and a gateway identity verification request initiated by the terminal;

the route control module 53 is configured to establish a connection for the terminal, of which both terminal identity verification and gateway identity verification succeed, with the wireless broadband network via the second wireless broadband module 54 through the WiFi connection; and the second wireless broadband module 54 is configured to establish a connection with the wireless broadband network.

The wireless gateway further includes an identity management module 55 which is configured to store a terminal identity validity list and a gateway ID of the wireless gateway;

the identity verification module 52 is further configured to decipher the terminal identity verification request to obtain a terminal ID, query the terminal ID in the terminal identity validity list stored in the identity management module 55, and judge that terminal identity verification succeeds when the terminal ID is found out; and judge that the terminal identity verification fails when the terminal ID is not found out, The identity verification module 52 is further configured to decipher the gateway identity verification request to obtain a gateway ID, compare the gateway ID obtained by decryption with the gateway ID stored in the identity management module 55, and judge that gateway identity verification succeeds if the gateway ID obtained by decryption is as same as the gateway ID stored in the identity management module 55; otherwise, judge that gateway identity verification fails.

The identity verification module 52 is further configured to calculate to obtain a second encryption key according to random numbers, and send the second encryption key to the terminal.

The identity verification module 52 is further configured to adopt the gateway ID stored in the identity management module 55 as a plaintext when the terminal initiates the gateway identity verification request, and encrypt the gateway ID using the second encryption key and a second encryption algorithm, where the second encryption algorithm is an irreversible encryption algorithm; and compare the ciphertext obtained by decryption with the ciphertext carried in the gateway identity verification request, and judge that gateway identity verification fails if the ciphertext obtained by decryption is different from the ciphertext carried in the gateway identity verification request; and judge that gateway identity verification succeeds if the ciphertext obtained by decryption is as same as the ciphertext carried in the gateway identity verification request.

In practical application, the second WiFi module 51, the identity verification module 52, the route control module 53 and the second wireless broadband module 54 may be implemented by a CPU, a DSP or an FPGA in the wireless gateway; and the identity management module 55 may be implemented by a nonvolatile storage medium in the wireless gateway.

Figure 6:
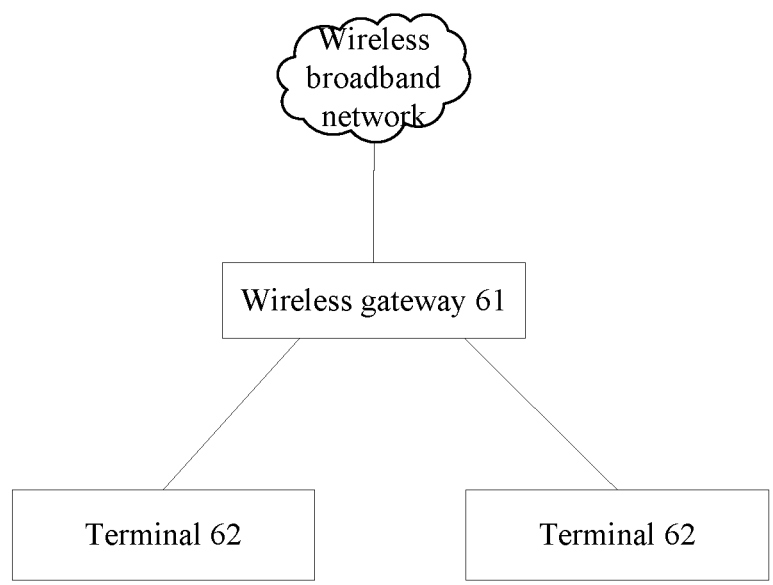
FIG. 6 is a schematic diagram showing a composition structure of a terminal access system in embodiments of the present disclosure.

The present disclosure further provides a system for implementing security access. As shown in FIG. 6, the system includes a wireless gateway 61 and more than one terminal 62, where the wireless gateway 61 is configured to establish an WiFi connection with the terminal 62 after successfully verifying information carried in an WiFi connection request of the terminal 62;

correspondingly conduct terminal identity verification and gateway identity verification according to a terminal identity verification request and a gateway identity verification request initiated by the terminal 62; and access the terminal 62 to a wireless broadband network through the WiFi connection when both the terminal identity verification and gateway identity verification succeed.

The terminal 62 is configured to initiate terminal identity verification and gateway identity verification to the wireless gateway 61 after establishing the WiFi connection with the wireless gateway 61; and after the initiated identity verification and gateway identity verification succeed, access to a wireless broadband network through the WiFi connection, A structure of the wireless gateway 61 is as same as that shown in FIG. 5, and a structure of the terminal 62 is as same as that shown in FIG. 4, which are not repeated herein in details.

Those skilled in the art should understand that embodiments of the present disclosure can provide a method, a system or a computer program product. Therefore, the present disclosure can adopt a form of a hardware embodiment, a software embodiment or an embodiment combining software and hardware. Moreover, the present disclosure can adopt a form of a computer program product capable of being implemented on one or more computer available storage media (including but not limited to disk memory, optical memory and the like) containing computer available program codes.

The present disclosure is described with reference to flow diagrams and/or block diagrams according to the method, device (system) and computer program product in embodiments of the present disclosure. It should be understood that each flow and/or block in the flow diagrams and/or block diagrams and the combination of flows and/or blocks in the flow diagrams and/or block diagrams can be implemented through computer program instructions. These computer program instructions can be provided for a general-purpose computer, a special-purpose computer, an embedded processor, or a processor of other programmable data processing device to generate a machine, so that an apparatus for implementing designated functions in one or more flows of the flow diagrams and/or one or more blocks of the block diagrams is generated through the instructions executed by the computer or the processor or other programmable data processing device.

These computer program instructions can also be stored in a computer readable memory which can guide the computer or other programmable data processing device to operate in a special mode, so that the instructions stored in the computer readable memory generates a manufactured product including an instruction apparatus, the instruction apparatus implementing designated functions in one or more flows of the flow diagrams and/or one or more blocks of the block diagrams.

These computer program instructions can also be loaded on the computer or other programmable data processing device, so that a series of operation steps are executed on the computer or other programmable device to generate processing of computer implementation. Therefore, the instructions executed on the computer or other programmable device provide steps for implementing designated functions in one or more flows of the flow diagrams and/or one or more blocks of the block diagrams.

The above descriptions are only implementation modes of embodiments of the present disclosure. It should be noted that, for those skilled in the art, many modifications and polishes may be made without departure from the technical principles of the present disclosure, and these modification and polishes should also be deemed to be fallen into the protection scope of the present disclosure.

The invention claimed is:

1. A wireless access method, comprising:
    establishing, by a wireless gateway after successfully verifying information carried in a Wireless Local Area Network (WLAN), connection request of a terminal, a WLAN connection with the terminal;
    correspondingly conducting terminal identity verification and gateway identity verification according to a terminal identity verification request and a gateway identity verification request initiated by the terminal; and
    accessing the terminal to a wireless broadband network through the WLAN connection when both the terminal identity verification and gateway identity verification succeed; the method further comprising:
    calculating to obtain a second encryption key according to random numbers, and sending the second encryption key to the terminal;
    accordingly, conducting gateway identity verification comprises:
    extracting the gateway ID of the wireless gateway as a plaintext by the wireless gateway, and encrypting the extracted gateway ID using the second encryption key and a second encryption algorithm, wherein the second encryption algorithm is an irreversible encryption algorithm; and comparing the ciphertext obtained by decryption with the ciphertext carried in the gateway identity verification request, and judging that gateway identity verification fails when the ciphertext obtained by decryption is different from the ciphertext carried in the gateway identity verification request; and judging that gateway identity verification succeeds when the ciphertext obtained by decryption is as same as the ciphertext carried in the gateway identity verification request.

2. The method of claim 1, wherein conducting terminal identity verification comprises:

deciphering the terminal identity verification request to obtain a terminal ID by the wireless gateway;

querying the terminal ID in a terminal identity validity list; and judging that terminal identity verification succeeds when the terminal ID is found out, and judging that terminal identity verification fails when the terminal ID is not found out.

3. The method of claim 1, wherein conducting gateway identity verification comprises:

deciphering the gateway identity verification request to obtain a gateway ID by the wireless gateway; and comparing the gateway ID obtained by decryption with a gateway ID of the wireless gateway, and judging that gateway identity verification succeeds when the gateway ID obtained by decryption is as same as the gateway ID of the wireless gateway; when the gateway ID obtained by decryption is different from the gateway ID of the wireless gateway, judging that gateway identity verification fails.

4. The method of claim 2, wherein conducting gateway identity verification comprises:

deciphering the gateway identity verification request to obtain a gateway ID by the wireless gateway; and comparing the gateway ID obtained by decryption with a gateway ID of the wireless gateway, and judging that gateway identity verification succeeds when the gateway ID obtained by decryption is as same as the gateway ID of the wireless gateway; when the gateway ID obtained by decryption is different from the gateway ID of the wireless gateway, judging that gateway identity verification fails.

5. A terminal, comprising:

at least one processor; and a memory communicably connected with the at least one processor for storing instructions executable by the at least one processor, wherein execution of the instructions by the at least one processor causes the at least one processor to:

establish a Wireless Local Area Network (WLAN) connection with a wireless gateway;

initiate terminal identity verification and gateway identity verification to the wireless gateway; and access to a wireless broadband network through the WLAN connection after the terminal identity verification and gateway identity verification initiated by the identity verification request module succeed; wherein the execution of the instructions by the at least one processor further causes the at least one processor to:

extract the gateway ID as a plaintext, and encrypt the gateway ID using a second encryption key and a second encryption algorithm; and carry the ciphertext obtained by encryption in the gateway identity verification request and send the ciphertext to the wireless gateway.

6. The terminal of claim 5, wherein the execution of the instructions by the at least one processor further causes the at least one processor to:

send a terminal identity verification request to the wireless gateway, wherein the terminal identity verification request carries terminal identity information; and send a gateway identity verification request to the wireless gateway when the terminal identity information is successfully verified, wherein the gateway identity verification request carries gateway identity information.

7. The terminal of claim 5, wherein the execution of the instructions by the at least one processor further causes the at least one processor to:

extract the terminal ID of the terminal as a plaintext, and calculate the terminal ID using an Internet protocol, IP, address and/or a medium access control, MAC, address to obtain a first encryption key;

encrypt the terminal ID using the first encryption key and a first encryption algorithm; and carry a ciphertext obtained by encryption in the terminal identity verification request and send the ciphertext to the wireless gateway.

8. A wireless gateway, comprising:

at least one processor; and a memory communicably connected with the at least one processor for storing instructions executable by the at least one processor, wherein execution of the instructions by the at least one processor causes the at least one processor to:

establish a Wireless Local Area Network (WLAN) connection with a terminal after successfully verifying information carried in the WLAN connection request of the terminal;

correspondingly conduct terminal identity verification and gateway identity verification according to a terminal identity verification request and a gateway identity verification request initiated by the terminal;

establish a connection for the terminal, of which both terminal identity verification and gateway identity verification succeed, with the wireless broadband network through the WLAN connection; and establish a connection with the wireless broadband network; wherein the execution of the instructions by the at least one processor further causes the at least one processor to:

calculate to obtain a second encryption key according to random number, and send the second encryption key to the terminal;

adopt the gateway ID stored in the wireless gateway as a plaintext when the terminal initiates the gateway identity verification request, and encrypt the gateway ID using the second encryption key and a second encryption algorithm, wherein the second encryption algorithm is an irreversible encryption algorithm; and compare the ciphertext obtained by decryption with the ciphertext carried in the gateway identity verification request, and judge that gateway identity verification fails if the ciphertext obtained by decryption is different from the ciphertext carried in the gateway identity verification request; and judge that gateway identity verification succeeds if the ciphertext obtained by decryption is as same as the ciphertext carried in the gateway identity verification request.

9. The wireless gateway of claim 8, wherein the execution of the instructions by the at least one processor further causes the at least one processor to:
  store a terminal identity validity list and a gateway ID of the wireless gateway; and
  decipher the terminal identity verification request to obtain a terminal ID, query the terminal ID in the terminal identity validity list stored in the wireless gateway, and judge that the terminal identity verification succeeds when the terminal ID is found out; and judge that the terminal identity verification fails when the terminal ID is not found out.

10. The wireless gateway of claim 9, wherein the execution of the instructions by the at least one processor further causes the at least one processor to:
  decipher the gateway identity verification request to obtain a gateway ID, compare the gateway ID obtained by decryption with the gateway ID stored in the wireless gateway, and judge that gateway identity verification succeeds if the gateway ID obtained by decryption is as same as the gateway ID stored in the wireless gateway; when the gateway ID obtained by decryption is different from the gateway ID stored in the wireless gateway, judge that gateway identity verification fails.

11. The wireless gateway of claim 8, wherein the execution of the instructions by the at least one processor further causes the at least one processor to:
  decipher the gateway identity verification request to obtain a gateway ID, compare the gateway ID obtained by decryption with the gateway ID stored in the wireless gateway, and judge that gateway identity verification succeeds if the gateway ID obtained by decryption is as same as the gateway ID stored in the wireless gateway; when the gateway ID obtained by decryption is different from the gateway ID stored in the wireless gateway, judge that gateway identity verification fails.

* * * * *